Figure 1:
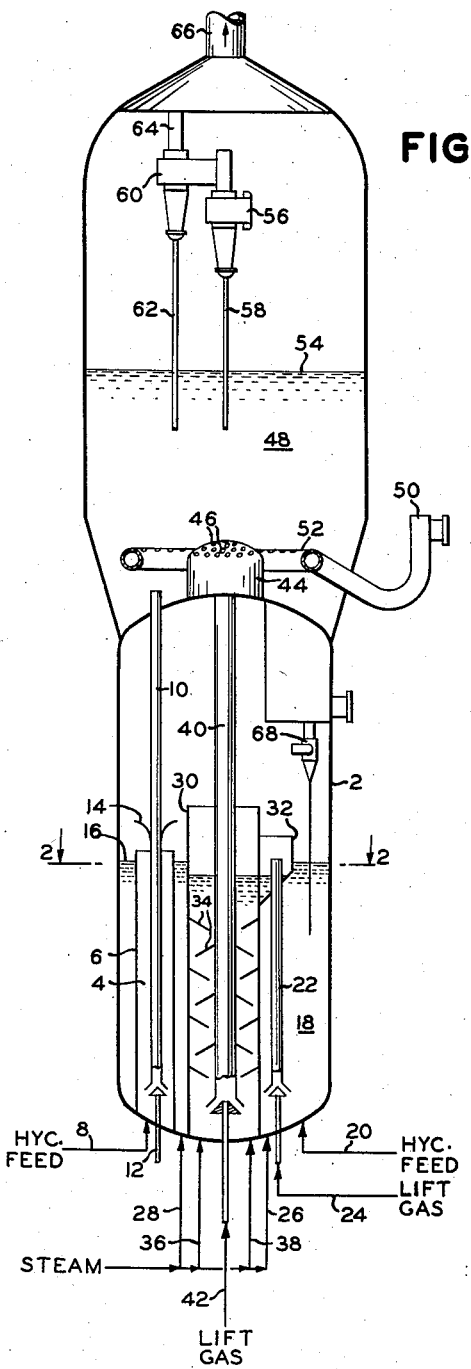

Aug. 18, 1959     L. F. RICE ET AL     2,900,325
CONVERSION PROCESS AND APPARATUS FOR USE THEREIN
Filed Dec. 12, 1956

INVENTORS
LOUIS F. RICE
JAMES L. PATTON
GEORGE F. TIMSON
WILLIAM A. PARTRIDE
BY
ATTORNEY
AGENT

2,900,325
CONVERSION PROCESS AND APPARATUS FOR USE THEREIN

Louis F. Rice, Ridgewood, and James L. Patton, Ramsey, N.J., George F. Timson, East Alton, Ill., and William R. Partridge, Livingston, N.J., assignors to The M. W. Kellogg Company, Jersey City, N.J., a corporation of Delaware Application December 12, 1956, Serial No. 627,866

14 Claims. (Cl. 208—78)

This invention relates to an improved process and apparatus for converting hydrocarbons and more particularly it relates to a process and apparatus for catalytically cracking a wide boiling range hydrocarbon to gasoline of high anti-knock quality.

In the fluid-type catalytic hydrocarbon conversion system, a powdered or granular catalytic material effects conversion while the catalyst is suspended in the gases, vapor or liquid hydrocarbon undergoing reaction. Subsequently, the catalyst and reaction products can be separated and the catalyst recycled to a reaction zone or passed to a regeneration zone. The spent or contaminated catalyst can be regenerated by suspending it in a gas mixture such as air to remove the carbonaceous deposits in which case the regenerated catalyst and regeneration gases must be separated prior to returning the catalyst to the reaction.

Numerous variations of the above cyclic process have been proposed each with its own benefits and deficiencies; however, none have been completely satisfactory either because of the complexity of the apparatus required or ineffective utilization of the catalyst to effect the desired hydrocarbon conversion.

An object of this invention is to provide an improved method and means for transferring finely divided catalyst through a reactor and a regenerator.

Another object of this invention is to provide a unitary hydrocarbon conversion catalytic regeneration apparatus which will be less expensive to fabricate and more efficient to operate than any prior system of this type.

A further object of this invention is to provide a more simple and efficient method and means for effectively utilizing the catalyst to promote the desired reaction.

Still another object of this invention is to provide a more simple and efficient method for minimizing the energy required to transfer catalyst from one zone to another.

Other objects and advantages of the present invention will become apparent from the following detailed description.

In accordance with the present invention, a process is provided for conducting chemical reactions in which a vaporous chemical reactant is contacted with finely divided catalytic material under conditions of relatively high temperature and high space velocity in a first reaction zone from which finely divided catalytic material is transferred to a fluidized bed of catalytic material in a second reaction zone. A vaporous chemical reactant is contacted with the fluidized bed of catalytic material in the second zone under more conventional cracking conditions; the chemical reactant introduced into the second reaction zone being the same as or different than the chemical reactant introduced into the first reaction zone.

In both of the reaction zones a reaction product is produced and the catalyst is contaminated with carbonaceous material and, accordingly, a portion of the contaminated catalyst is withdrawn from the second reaction zone and passed upwardly as a suspension in a lifting medium, such as steam, to the top of a stripping zone which is mounted within the second reaction zone and which may contain a plurality of baffles, if desired. A partial stripping of the spent catalyst is effected as it is lifted from the second reaction zone to the top of the stripping zone as a suspension in steam. The catalyst and lifting steam are separated by allowing the catalyst to settle downwardly into the second stage of the stripper, and the final or second stage of stripping is accomplished within the stripping zone by passing steam upwardly through the catalyst within the stripping zone, with the catalyst being either in the form of a fluidized bed or a cascade over a plurality of baffles.

The stripped catalyst from the stripper is transferred upwardly through a spent catalyst riser to a fluidized bed of catalyst in a regenerator and is introduced into the regenerator at a point below the level of the dense phase bed of catalyst therein. The catalyst in the regenerator is regenerated by contacting it with an oxygen containing gas such as air and the regenerated catalyst is then transferred into the reactor, usually into the first reaction zone, through a regenerated catalyst standpipe. If desired, however, a plurality of regenerated catalyst standpipes may be used which extend from the regenerator into both the first and second reaction zones, or in the preferred embodiment, one or more standpipes may be used which extend into the first reaction zone only.

In some systems the rate of deposition of carbonaceous material on the catalyst is small and, consequently, a low catalyst circulation rate is used. The present invention is particularly applicable to a system in which 1.0 cubic feet of oxygen containing gas, i.e., air (measured at 60° F. in 760 mm. Hg), are required per pound of catalyst being circulated or usually about 0.7 to 2.0 cubic feet per pound of catalyst.

In the present process, fresh feed is contacted in a primary reactor or first reaction zone with regenerated catalyst and cracked at a relatively high temperature in the range of about 900 to 1050° F. using a high weight space velocity in the range of about 5 to 50 pounds per hour of oil feed per pound of catalyst in the reaction zone. The cracked vapor passes upwardly through the first reaction zone at velocities ranging from as low as 5 feet per second to as high as 25 to 30 feet per second, depending upon the severity of cracking conditions required for the particular feed. The fluid density in the first reaction zone is low and is generally in the range of about 2 to 25 pounds per cubic foot. The catalyst to oil ratio in the first reaction zone on a weight basis is between about 5 and about 25.

Catalyst and vapors are separated in a disengaging space above the fluidized bed in the second reaction zone, and the catalyst settles into this fluidized bed. A second feed stream is introduced into the bottom of the second reaction zone and cracked under more conventional cracking conditions, i.e., the cracking temperature in the secondary reactor or second reaction zone may be between about 850 and 950° F., and the reaction pressure in both zones is maintained in the range of about 1 atmosphere to about 50 p.s.i.g., preferably between about 5 to about 25 p.s.i.g. The weight space velocity of feed charged to the secondary reactor may be about 0.25 to about 15, preferably about 0.5 to about 5.0. The catalyst to oil ratio on a weight basis is within the range of about 2 to about 25, preferably about 5 to about 10. The invention is not restricted to the segregated cracking of two feed streams only and additional high velocity, high temperature reactors may be incorporated within the reactor pressure vessel, if desired.

As a result of catalytically cracking the high boiling hydrocarbon oils, carbonaceous material is deposited upon the catalyst and a portion of the spent catalyst is withdrawn from the secondary reactor or second reactor zone through a plug valve into a first stage stripper, which is an elongated conduit extending from a point near the bottom of the reactor pressure vessel to a point above the level of catalyst in the second stage stripper. The spent catalyst is lifted through the first stage stripper by means of steam introduced through the hollow plug valve at the bottom of the first stage stripper, the first stage stripper being open at the top and venting into the disengaging space of the combined reactor. A partition separates the first and second stage stripper from the secondary reactor bed and is extended well above the top of the bed, i.e., about 3 to 15 feet, in order to minimize mixing of bed catalyst and stripped or partially stripped catalyst which would reduce the stripping efficiency.

In the first stage stripper, the steam conveys the catalyst upwardly to the space above the second stripping stage at velocities in the range of about 5 to 30 feet per second. The steam and catalyst are separated by allowing the catalyst to settle downwardly into the second stage of the stripper. The second stage of stripping is accomplished in a central well located within the reactor pressure vessel, preferably by passing steam upwardly through the catalyst as it cascades downwardly over a series of perforated baffles. However, the baffles may be eliminated and the catalyst stripped as a dense fluid bed in the second stripping stage. When baffles are used they may advantageously be of the type disclosed in copending application Serial No. 461,777, filed October 12, 1954, now U.S. Patent No. 2,854,319.

In the first stage stripper, stripping occurs at a temperature of about 800 to 950° F., and the fluid density in the first stage stripper may be in the range of about 5 to 25 pounds per cubic foot using a steam rate of about 1 to 5 pounds per thousand pounds of catalyst. In the second stage stripper the temperature is ordinarily in the range of about 800 to 950° F. and the catalyst is stripped with about 1 to 5 pounds of steam per thousand pounds of catalyst. In addition to steam other conventional stripping agents may be used, such as hydrogen or normally gaseous hydrocarbons such as ethane, methane, propane, and the like, or an inert gas such as nitrogen.

From the second stage stripper the catalyst is conveyed upwardly through a catalyst riser to a regenerator by introducing a lifting gas such as air through a hollow plug valve at the bottom of the catalyst riser. A partial regeneration of the catalyst therefore occurs in the catalyst riser at a temperature of about 850 to 1050° F. The fluid density in the riser may be in the range of about 2 to 20 pounds per cubic foot and the velocity in the riser is in the range of about 5 to 50 feet per second.

The stripped and partially regenerated catalyst is discharged from the centrally located stripped catalyst riser into a regenerator wherein the catalyst is regenerated by contacting it with an oxygen containing gas such as air or diluted air at a temperature in the range of about 700 and 1200° F., generally about 1000 to 1150° F. The pressure in the regenerator may be in the range of about 0 to 30 p.s.i.g., preferably about 10 to 20 p.s.i.g. After regeneration, the catalyst is returned to the first or second reaction zone, or both, through one or more regenerated catalyst standpipes through which the flow of catalyst is regulated by conventional plug valves.

The high boiling hydrocarbon oils which are especially adapted for use as fresh feed to the first reaction zone or primary reactor have an initial boiling point of about 400 to 700° F., an end point of about 900 to 1200° F., or higher and an API gravity of about 10 to 30°, these hydrocarbons being, for example, gas oils, reduced crudes, residual oils, heavy distillates, and the like. The feed to the secondary reactor or second reaction zone may be the same as the fresh feed to the first reactor or it may be different and may be a material such as a cycle oil or gas oil having an initial boiling point of about 350 to 600° F., an end point of about 650 to 1000° F., and an API gravity in the range of about 10 to 30°.

The cracking catalyst may be a siliceous material containing about 70 to 90 percent by weight of silica with the remainder being one or more of other suitable materials such as alumina, boria, magnesium, zirconium, and the like to form mixtures thereof such as, silica-alumina-boria, silica-alumina-magnesium, silica-alumina-zirconium, silica-alumina etc.

The apparatus of the present invention can be of either the single or double head type as shown in copending application Serial No. 464,476, filed October 25, 1954, the latter being the type of construction in which the regenerator is positioned above the reactor in such a manner that air can circulate between the vessels. In the double head system the two heads are connected by means of a structure having the form of an inverted truncated cone containing suitable openings for the passage of air. The single head system is more economical and is structurally superior in those cases where the diameter of the regenerator is not more than about 25 feet, since at diameters below 25 feet the amount of metal expansion in normal operation can be accommodated by using metal thicknesses in the single head vessel structure which can be easily fabricated and handled.

Figure 2:
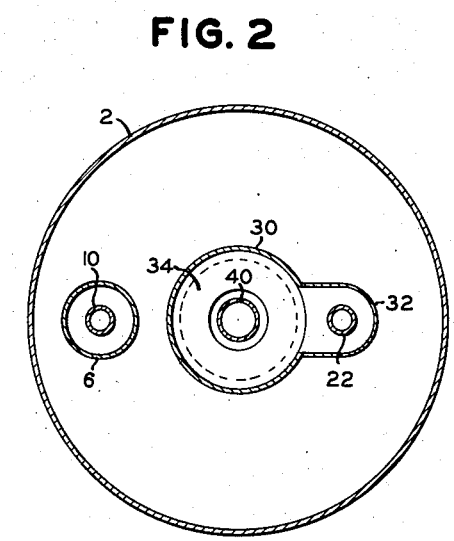

Referring now to the accompanying drawing in which:

Figure 1 is a diagrammatic view in elevation of the apparatus of the present invention, and Figure 2 is a sectional view taken on line A—A of Figure 1 looking downwardly.

The apparatus comprises a pressure vessel 2 provided at the lower left side thereof, as viewed in Figure 1, with a first reaction zone 4 encompassed by baffle 6 which may be cylindrical in shape or some other shape, if desired. A fresh feed which may be liquid, vapor or a mixture of both, is introduced through the nozzle 8 to the lower portion of reaction zone 4 wherein it is admixed with a mass of finely divided cracking catalyst present in the reaction zone 4. The regenerated catalyst in regeneration zone 48 being transferred downwardly through standpipe 10 to the lower portion of reaction zone 4 and the flow of the catalyst into the reaction zone 4 from standpipe 10 being regulated by a conventional plug valve 12.

The mixture of catalyst and hydrocarbon feed during conversion moves upwardly through the reaction zone 4 under conditions of relatively high temperature, high space velocity and low density to a catalyst disengaging zone thereabove. To assist in separating catalyst, a deflecting baffle 14 is provided which is secured to the regenerated catalyst standpipe 10 at a point above the level 16 of the fluidized bed of catalyst in the second reaction zone 18. The separated catalyst settles back into a fluidized bed of catalyst maintained in the reaction zone 18 and the products of reaction pass out of the catalyst disengaging zone 18 and the products of reaction pass out of the catalyst disengaging zone through a suitable arrangement of cyclone separators, designated as 68, with any entrained catalyst in the reaction products being separated and returned to the fluidized bed of catalyst in reaction zone 18 through a suitable dipleg.

A second feed stream, which may be the same or different than the first feed stream, is introduced into the second reaction zone 18 through the nozzle 20, or a plurality of such nozzles may be used, if desired.

From the second reaction zone 18 spent catalyst is withdrawn from the lower portion thereof and passed upwardly through a substantially vertical riser 22 by means of a lift gas, such as steam, introduced through the hollow plug valve 24. Partial stripping of the catalyst is accomplished as the catalyst is passed upwardly through riser 22. Fluidizing steam is also introduced into the bottom of the reaction zones through nozzles 26 and 28. The lift gas in the riser 22 conveys the catalyst upwardly to a catalyst disengaging space formed by the walls 30 and 32 of the second stripping stage. The catalyst riser 22 discharges into a chamber formed by the wall 32, connected to cylindrical wall 30 as shown in Figure 2. The steam and catalyst separate in the space above the second stage stripper and the catalyst is stripped in the second stage stripper by cascading downwardly as a dense phase bed across the baffles 34 which are preferably perforated to facilitate the passage of steam therethrough. However, the baffles 34 may be removed and the catalyst stripped as a downwardly moving dense fluidized bed of contact material. Steam is introduced into the bottom of the second stage stripper through the nozzles 36 and 38 respectively.

From the bottom of the second stage stripper, the stripped catalyst is conveyed upwardly through a stripped catalyst riser 40 by means of a lift gas such as air introduced into the bottom through hollow plug valve 42. The catalyst transferred upwardly through the stripped catalyst riser 40 discharges into a distributor chamber 44 containing perforations 46 prior to entering the dense fluidized bed of catalyst 48 maintained in the regenerator having an upper bed level 54. Additional regeneration gas may be introduced by conduit 50 to header 52 for supplying the necessary quantity of regeneration gas to the bottom of the dense phase bed of catalyst. The regeneration gases are separated from any entrained catalyst in a disengaging zone above the dense bed and by passing through a plurality of cyclone separators, designated as 56 and 60, containing diplegs 58 and 62. Catalyst fines separated from the regeneration gases are returned to the catalyst bed through the respective diplegs. Regeneration gases are then removed by conduits 64 and 66. The regenerator may be of the type disclosed in copending application Serial No. 464,476, filed October 25, 1954, and the catalyst in the regenerator may be regenerated in the manner disclosed in this copending application.

From the regenerator, the regenerated catalyst is returned to the first reaction zone 4 through the regenerated catalyst standpipe 10 with the flow of regenerated catalyst being regulated by a conventional plug valve 12. Additional standpipes may be provided, if desired, which discharge regenerated catalyst into the first reaction zone 4 or one or more standpipes may also be provided which discharge into the second reaction zone 18 in addition to those provided for the first reaction. It is preferred, however, that all of the catalyst pass through the first reaction zone prior to entering the second.

The invention will be further illustrated by reference to the following specific example:

*Example 1*

This example illustrates the operating conditions suitable for use in the fluid catalytic cracking system of this invention adapted to process 8660 barrels per day of heavy gas oil, i.e., a feed having an API gravity of 26.5, coke=8.5 weight percent, at a throughput ratio of 1.8 and fresh feed conversion of 72 volume percent. The feed introduced into the second reaction zone was a cycle oil having an API gravity of 21.2.

TABLE I

*Reactor pressure vessel:*
```
    Length—feed _____  44.0
    Diameter—feet _____ 15.46
```
*First stage reaction zone:*
```
    Length—feet _____  22.0
    Cross sectional area—square feet (equivalent
        diameter=5.91 feet) _____  27.5
    Temperature—° F. _____   950
    Space velocity _____     7
    Catalyst to oil ratio _____    10
    Pressure—p.s.i.g. _____    16
    Density of catalyst—vapor mixture (#/CF)  21.5
    Superficial velocity of vapor (avg.) ft./sec.  3.5
    First reaction zone pressure drop—p.s.i.  2.8
```
*Second stage reaction zone:*
```
    Length—feet _____  23.0
    Cross section area—square feet (equivalent
        diameter=12.4 feet) _____   120
    Temperature—° F. _____   900
    Space velocity _____   0.9
    Catalyst to oil ratio _____    17
    Pressure—p.s.i.g. _____    16
    Density of catalyst—vapor mixture ___    35
    Superficial velocity of vapor (ft./sec.)  0.7
    Second reaction zone pressure drop—p.s.i.  5.6
```
*First stage stripper:*
```
    Length—feet _____    23
    Inside diameter—inches _____    29
    Temperature—° F. _____   900
    Catalyst density—pounds per cubic foot   14
    Superficial vapor velocity—ft./sec. _  10.4
    Steam rate—#/hr. _____ 5,300
```
*Second stage stripper:*
```
    Length—feet _____    23
    Diameter—feet (cross sectional area=39.5
        sq. ft.) _____   7.5
    Steam rate—#/hr. _____ 5,550
    Temperature—° F. _____   900
    Catalyst holdup in stripper—tons ____    16
```
*Stripped catalyst riser:*
```
    Length—feet _____    49
    Inside diameter—inches _____    27
    Temperature—° F. _____ 900–1000
    Catalyst density—pounds per cubic foot  5.6
    Superficial vapor velocity—ft./sec. _    41
    Air rate—#/hr. _____ 30,680
```
*Regenerator:*
```
    Length—feet _____ 37'0"
    Diameter—feet _____ 14.46–22.46 (18.46 Avg.)
    Temperature—° F. _____ 1,100
    Pressure—p.s.i.g. _____    10
    Catalyst density—pounds per cubic foot   30
    Gas velocity—ft./sec. _____  2.25
    Catalyst holdup—tons _____    94
```
*Regenerated catalyst standpipe:*
```
    Density—lbs./cu. ft. _____    30
    Pressure head—p.s.i. _____    10
    Velocity—average—ft./sec. _____   5.5
    Valve pressure drop—p.s.i. _____   5.2
```

It will be obvious to those skilled in the art that many modifications may be made within the scope of the present invention without departing from the spirit thereof, and the invention includes all such modifications.

We claim:

1. A conversion process which comprises passing a chemical reactant upwardly through a first reaction zone in contact with a dilute suspension of finely divided catalytic material, separating products of reaction from said dilute catalytic suspension, passing catalytic material separated from the first reaction zone to a dense fluidized bed of catalytic material in a second reaction zone, surrounding said first reaction zone, said first and second reaction zones being in open communication with one another in the upper portion thereof, passing a chemical reactant upwardly through the dense fluidized bed of catalytic material in said second reaction zone, commingling products of the first reaction zone with those of the second reaction zone above the dense fluidized bed of catalyst in the second reaction zone, withdrawing catalytic material from the lower portion of the second reaction zone and passing the same upwardly through a first stripping zone to the upper portion of a second stripping zone within said second reaction zone, passing the catalytic material downwardly through said second stripping zone as a relatively dense bed of catalytic material, passing stripped catalytic material from the lower portion of said second stripping zone to a regeneration zone, passing regenerated catalyst to the lower portion of said first reaction zone and recovering reaction products from the upper portion of said second reaction zone.

2. A conversion process which comprises passing a mixture of a chemical reactant and finely divided catalytic material upwardly through a first reaction zone, separating catalytic material from the upper portion of said first reaction zone and passing the same directly to the top of a dense fluidized bed of catalytic material in a second reaction zone, said first and second reaction zones being in open communication with one another in the upper portion thereof, passing a chemical reactant upwardly through the dense fluidized catalyst bed in said second reaction zone, commingling reaction products of the first reaction zone with those of the second reaction zone above the dense fluidized bed of catalyst in the second reaction zone, withdrawing catalytic material from the lower portion of the second reaction zone and passing the same upwardly through a first elongated confined stripping zone to the upper portion of a relatively dense downwardly moving fluidized catalytic bed in a second stripping zone, said stripping zones being in open communication with one another in the upper portion thereof, passing catalytic material downwardly through said second stripping zone countercurrent to a stream of stripping gas introduced to the lower portion thereof, passing stripped catalytic material from the lower portion of said second stripping zone to a regeneration zone and passing regenerated catalyst to the lower portion of said first reaction zone.

3. A hydrocarbon conversion process which comprises passing a hydrocarbon reactant in admixture with finely divided catalytic material upwardly through a first reaction zone under suitable conversion conditions to produce a desired product, separating catalytic material from the product of the first reaction zone and passing the separated catalytic material to a dense fluidized bed of catalytic material in a second reaction zone, passing a hydrocarbon reactant upwardly through said dense fluidized bed of catalyst in the second reaction zone under conversion conditions to a desired product, thereby contaminating the catalyst, withdrawing contaminated catalytic material from the lower portion of the second reaction zone and passing said withdrawn contaminated catalyst upwardly to the upper portion of a dense fluidized bed of catalyst in a stripping zone, stripping catalyst in said stripping zone with stripping gas introduced at the lower portion thereof, commingling products of reaction with stripped products above the dense bed of catalyst in said second reaction zone, withdrawing said reaction products from said reaction zone, passing the stripped catalytic material from the lower portion of the stripping zone upwardly as a confined stream to a regeneration zone, regenerating catalyst in said regeneration zone and returning the regenerated catalyst downwardly as a confined stream to the lower portion of the first reaction zone.

4. A hydrocarbon conversion process which comprises passing a first hydrocarbon reactant admixed with finely divided catalytic material upwardly as a dilute suspension through a first reaction zone under elevated temperature conditions to effect conversion of said reactant to desired products, passing catalytic material from the first reaction zone to the top of a dense fluidized bed of catalytic material in a second reaction zone surrounding said first reaction zone, said reaction zones being in open communication with one another in the upper portion thereof, passing a second hydrocarbon reactant upwardly through said dense fluidized bed of catalyst in the second reaction zone under suitable conversion conditions including a temperature lower than that employed in said first reaction zone to produce a desired product thereby contaminating the catalyst, withdrawing contaminated catalytic material from the lower portion of the second reaction zone and passing said withdrawn catalytic material to a stripping zone, stripping said catalyst material in said stripping zone, passing stripped catalytic material to a regeneration zone, regenerating catalyst in said regeneration zone, returning regenerated catalyst to the first reaction zone and withdrawing reaction products from above the dense fluidized bed of catalytic material for further separation into desired constituents.

5. A process for cracking dissimilar hydrocarbon feed stocks in the presence of finely divided catalytic material which comprises passing freshly regenerated catalytic material in admixture with a fresh hydrocarbon feed stock upwardly through a first cracking zone under conditions to effect conversion to desired products, reducing the velocity of said mixture in an enlarged settling zone such that the catalytic material is separated from the products of said first cracking zone and falls into a dense fluidized bed of catalyst in a second cracking zone surrounding said first cracking zone, passing a hydrocarbon feed stock, more refractory than said fresh feed, into the dense fluidized bed of catalyst in said second cracking zone and effecting conversion under less severe temperature cracking conditions than those employed in said first cracking zone to produce a hydrocarbon product thereby contaminating the catalyst with carbonaceous material, commingling products of said first and second cracking zones above the dense bed of catalytic material and withdrawing the same for separation into desired constituents, passing catalytic material contaminated with reaction products from the lower portion of said dense fluidized catalyst bed upwardly through a first stripping zone in concurrent contact with a suitable stripping gas to the upper portion of a second stripping zone, passing catalytic material downwardly through said second stripping zone as a relatively dense fluidized bed of catalyst countercurrent to a stream of stripping gas introduced to the lower portion of said second stripping zone, commingling stripped products of reaction and stripping gas with products of said first and second cracking zone above the dense fluidized bed of catalyst and withdrawing the same for separation into desired products, passing stripped catalyst from the lower portion of said second stripping zone upwardly as a confined stream through said stripping zone to a regeneration zone, regenerating catalyst in said regeneration zone and passing regenerated catalyst to the lower portion of said first cracking zone in indirect heat exchange with catalyst and hydrocarbon feed passed upwardly through said first cracking zone.

6. An improved process for the catalytic cracking of different hydrocarbon feed stocks which comprises passing one of said hydrocarbon feed stocks in admixture with finely divided catalyst through a first cracking zone in indirect heat exchange with freshly regenerated catalyst under suitable cracking conditions to effect conversion to desired products, separating catalyst from products of said first cracking zone and passing said separated catalyst to a dense fluidized bed of catalyst in a second cracking zone, contacting said dense fluidized bed of catalyst with another of said hydrocarbon feed stocks under suitable cracking conditions to effect conversion to desired products thereby contaminating the catalyst, removing catalyst from the lower portion of said dense fluidized catalyst bed and passing the same through at least two sequentially connected stripping zones to effect stripping of the contaminated catalyst of reaction products, combining stripped products of reaction, stripping gas, and products of said first and second cracking zone above the dense fluidized bed of catalyst and recovering said combined products.

7. A vessel comprising in combination a first cylindrical chamber open at its upper end extending upwardly from the bottom of said vessel and forming an annular chamber with the walls of said vessel, a first open end conduit extending upwardly from the lower portion of said annular chamber and connected with the upper portion of said first cylindrical chamber, a second cylindrical chamber open at its upper end extending upwardly from the bottom of said annular chamber and terminating below the upper portion of said vessel, a second open end conduit centrally positioned within said first cylindrical chamber extending upwardly from the lower portion thereof to a regeneration chamber, a third open end conduit extending downwardly from said regeneration chamber to the lower portion of said second cylindrical chamber and means for adding a gaseous material to the lower portion of each of said chambers and the bottom of said first and second conduits.

8. A unitary vessel comprising in combination an upper regeneration chamber and a lower conversion chamber, said conversion chamber containing an elongated stripping chamber open at its upper end extending substantially vertically upwardly from the bottom of said conversion chamber to above the upper level of a dense bed of finely divided contact material in said conversion chamber, a first open end conduit connecting the lower portion of said dense bed of contact material with the upper portion of said stripping chamber, an elongated reaction chamber open at its upper end extending upwardly from the bottom of said conversion chamber to a point above the upper level of the dense bed of contact material in said conversion chamber, a second open end conduit connecting the lower portion of said regeneration chamber with the lower portion of said reaction chamber, a third open end conduit connecting the lower portion of said stripping chamber with said regeneration chamber, means for introducing reactant material to the lower portion of said conversion chamber and said reaction chamber, means for introducing a gaseous material to the lower portion of said stripping chamber and said regeneration chamber, means for introducing a gaseous material to the bottom of said first and third open end conduits and means for recovering products from the upper portion of said conversion chamber.

9. A unitary vessel comprising in combination a plurality of reaction chambers disposed in the lower portion of the vessel, a plurality of stripping chambers positioned within one of said reaction chambers, said reaction chambers and said stripping chambers in open communication with one another in the upper portion thereof, a regeneration chamber positioned in the upper portion of said vessel, means for passing finely divided contact material from said regeneration chamber to the lower portion of the first of said reaction chambers, means for transferring said contact material from the upper portion of said first reaction chamber to a second reaction chamber, means for passing contact material from the lower portion of said second reaction chamber upwardly through an elongated confined first stripping chamber to the upper portion of a second stripping chamber, means for passing contact material downwardly through said second stripping chamber to the lower portion thereof, conduit means for transferring contact material from the lower portion of said second stripping chamber upwardly through an elongated confined transfer conduit coaxially positioned within said second stripping chamber to the lower portion of said regeneration chamber, means for introducing regeneration gas to the lower portion of said regeneration chamber, means for introducing hydrocarbon reactants to the lower portion of each of said reaction chambers, means for introducing stripping gas to the lower portion of each of said stripping chambers and means for introducing lift gas to the lower portion of said elongated confined transfer conduit.

10. A unitary vessel comprising in combination a plurality of sequentially connected reaction chambers relative to flow of finely divided catalytic material disposed in the lower portion of the vessel, a plurality of sequentially connected stripping chambers relative to catalytic flow positioned within one of said reaction chambers, a regeneration chamber positioned in the upper portion of said vessel, conduit means for passing finely divided contact material from said regeneration chamber to the lower portion of the first of said plurality of reaction chambers, means for transferring said contact material from the upper portion of said first reaction chamber to a second reaction chamber, means for passing contact material from the lower portion of said second reaction chamber upwardly through an elongated confined first stripping chamber to the upper portion of said second stripping chamber, means for passing contact material downwardly through said second stripping chamber to the lower portion thereof, conduit means for transferring contact material from the lower portion of said second stripping chamber upwardly to the lower portion of said regeneration chamber, means for introducing regeneration gas to the lower portion of said regeneration chamber, means for introducing hydrocarbon reactants to the lower portion of each of said reaction chambers, means for introducing stripping gas to the lower portion of each of said stripping chambers, means for introducing lift gas to the lower portion of said elongated confined transfer conduit and means for collecting products of said reaction zones and said stripping zones prior to removal from said vessel for further separation into desired constituents.

11. A unitary vessel comprising in combination a plurality of contact chambers connected in series relative to flow of finely divided contact material positioned in the lower portion of said vessel, a regeneration chamber positioned in the upper portion of said vessel, means for passing finely divided solid contact material from the lower portion to the upper portion of the first of said contact chambers, means for passing contact material from the upper portion of said first contact chamber downwardly through a second contact chamber, first conduit means for conveying contact material from the lower portion of said second chamber to the upper portion of a third contact chamber, second conduit means for transferring contact material from the lower portion of said third chamber to the lower portion of said regeneration chamber, means for introducing a reactant material to the lower portion of said first and second chambers, means for introducing a gaseous material to the lower portion of said third chamber, and means for introducing a gaseous material to the lower portion of said first and second conduit means.

12. A unitary vessel comprising in combination at least two reaction chambers positioned in the lower portion of said vessel, a regeneration chamber positioned in the upper portion of said vessel, means for passing finely divided solid contact material from the lower portion to the upper portion of the first of said reaction chambers, means for passing contact material from said first chamber downwardly through the second of said reaction chambers, said first reaction chamber positioned within said second reaction chamber, conduit means for conveying contact material from the lower portion of said second chamber to the upper portion of a third chamber, said third chamber concentrically positioned within said second reaction chamber, means for passing contact material downwardly through said third chamber countercurrent to gaseous material introduced to the bottom of said third chamber, conduit means for transferring contact material from the lower portion of said third chamber to the lower portion of said regeneration chamber, means for introducing a hydrocarbon reactant to the lower portion of said first and second chambers, and means for removing products of reaction of said first and second reaction chambers from the upper portion of said second reaction chamber.

13. A unitary vessel comprising in combination, a regenerator chamber positioned in the upper portion of said vessel, an upflow catalytic reactor chamber and a downflow catalytic reactor chamber serially connected and positioned in the lower portion of said vessel, an upflow catalyst stripper chamber and a downflow catalyst stripper chamber serially connected and positioned within said downflow catalytic reactor chamber, each of said chambers being in open communication with one another in the upper portion thereof, means for transferring finely divided catalyst sequentially through said reactors and then said strippers, conduit means for passing catalyst substantially vertically downwardly from said regenerator chamber to the lower portion of said upflow reactor chamber, conduit means for passing catalyst substantially vertically upwardly from the lower portion of said downflow stripper chamber to the lower portion of said regenerator chamber, means for introducing a reactant material to the lower portion of each of said reactor chambers and means for removing products of said upflow reactor chamber with products from said downflow reactor chamber.

14. An apparatus comprising in combination a regenerator chamber, a dense fluidized catalytic bed reactor chamber, an upflow dilute phase catalytic reactor chamber positioned within and extending upwardly from the bottom of said dense fluidized catalytic bed reactor chamber, a downflow catalyst stripper chamber concentrically positioned within said dense fluidized catalytic bed reactor chamber, an upflow substantially vertical catalyst transfer conduit connecting the lower portion of said dense fluidized catalytic reactor chamber with the upper portion of said downflow catalyst stripper chamber, conduit means for passing catalyst from the lower portion of the regenerator chamber to the lower portion of the upflow catalytic reactor chamber, conduit means for passing catalyst from the lower portion of said stripper chamber to the lower portion of said regenerator chamber, means for separately introducing a reactant material to each of said reactor chambers and means for withdrawing combined products of said reactor chambers from the upper portion of said dense fluidized catalytic bed reactor chamber.

References Cited in the file of this patent

UNITED STATES PATENTS

| | | |
|---|---|---|
| 2,457,232 | Hengstebeck | Dec. 28, 1948 |
| 2,461,958 | Bonnell | Feb. 15, 1949 |
| 2,488,032 | Johnson | Nov. 15, 1949 |
| 2,658,822 | Hengstebeck | Nov. 10, 1953 |
| 2,698,281 | Leffer | Dec. 28, 1954 |